(12) United States Patent
Caulier

(10) Patent No.: US 10,746,679 B2
(45) Date of Patent: Aug. 18, 2020

(54) METHOD FOR INSPECTING A METAL SURFACE AND ASSOCIATED DEVICE

(71) Applicant: FRAMATOME, Courbevoie (FR)

(72) Inventor: Yannick Caulier, Manosque (FR)

(73) Assignee: FRAMATOME, Courbevoie (FR)

( * ) Notice: Subject to any disclaimer, the term of this patent is extended or adjusted under 35 U.S.C. 154(b) by 107 days.

(21) Appl. No.: 16/313,548

(22) PCT Filed: Jun. 29, 2017

(86) PCT No.: PCT/EP2017/066204
§ 371 (c)(1),
(2) Date: Dec. 27, 2018

(87) PCT Pub. No.: WO2018/002263
PCT Pub. Date: Jan. 4, 2018

(65) Prior Publication Data
US 2019/0317035 A1 Oct. 17, 2019

(30) Foreign Application Priority Data

Jun. 30, 2016 (FR) ...................................... 16 56226

(51) Int. Cl.
*G01N 25/72* (2006.01)
*G06T 7/00* (2017.01)

(52) U.S. Cl.
CPC ........... *G01N 25/72* (2013.01); *G06T 7/0004* (2013.01); *G06T 2207/10048* (2013.01); *G06T 2207/30136* (2013.01)

(58) Field of Classification Search
CPC .......... G01N 25/72; G06T 2207/30136; G06T 2207/10048; G06T 7/0004
See application file for complete search history.

(56) References Cited

U.S. PATENT DOCUMENTS

| 4,772,789 A | 9/1988 | Maram et al. |
| 2003/0165178 A1 | 9/2003 | Borden et al. |
| 2017/0043431 A1* | 2/2017 | Kuba ..................... B23K 26/21 |

FOREIGN PATENT DOCUMENTS

| DE | 102013110667 A1 | 3/2015 |
| EP | 0253734 A1 | 1/1988 |
| WO | WO2009055370 A1 | 4/2009 |

OTHER PUBLICATIONS

Semerok A et al: "Laser Active Thermography for Non-Destructive Testing", Optomechatronic Micro/Nano Devices and Components III: Oct. 8-10, 2007, Lausanne, Switzerland, vol. 9065, Nov. 28, 2013, pp. 90650A-90650A.

(Continued)

*Primary Examiner* — Don K Wong
(74) *Attorney, Agent, or Firm* — Davidson, Davidson & Kappel, LLC

(57) ABSTRACT

A method for inspecting a metal surface (12) includes providing a first laser source (14) that is arranged to generate a first laser beam having a first wavelength comprised between 1000 nm and 1100 nm and a power higher than 1 W; providing a second laser source (16) that is arranged to generate a second laser beam having a second wavelength comprised between 1500 nm and 1800 nm and a power higher than 1 W; activating one of the first and second laser sources and transmitting the first or second laser beam to the entrance (22) of an optic (18); scanning the metal surface (12) with the laser beam projected by the optic; and acquiring at least one image of the infrared radiation emitted by the metal surface (12).

10 Claims, 1 Drawing Sheet

(56) References Cited

OTHER PUBLICATIONS

Bandyopadhyay PK: "Multispectral antireflection coating simultaneously effective in visible, diode laser, Nd-YAG and eye safe laser wavelength", Journal of Physics: Conference Series, Institute of Physics Publishing, Bristol. GB, vol. 114, No. 1, May 1, 2008, p. 12004.

S Elhadj et al: "LLNL-JRNL-584155 Combined infrared thermal imaging and laser heating for the study of materials thermophysical and processing properties at high temperatures Critical reviews in Solid State and Materials Sciences", Sep. 24, 2012, URL:https://e-reports-ext.llnl.gov/pdf/665093.pdf.

* cited by examiner

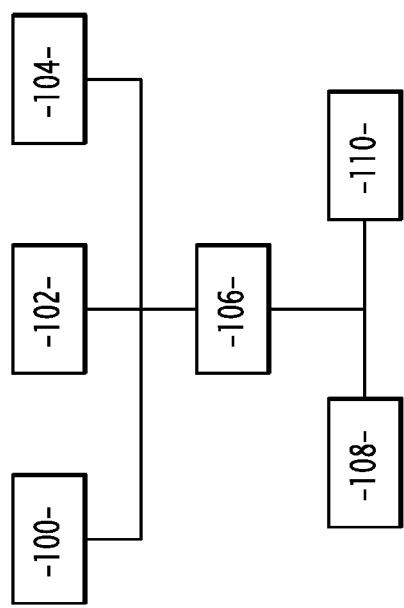
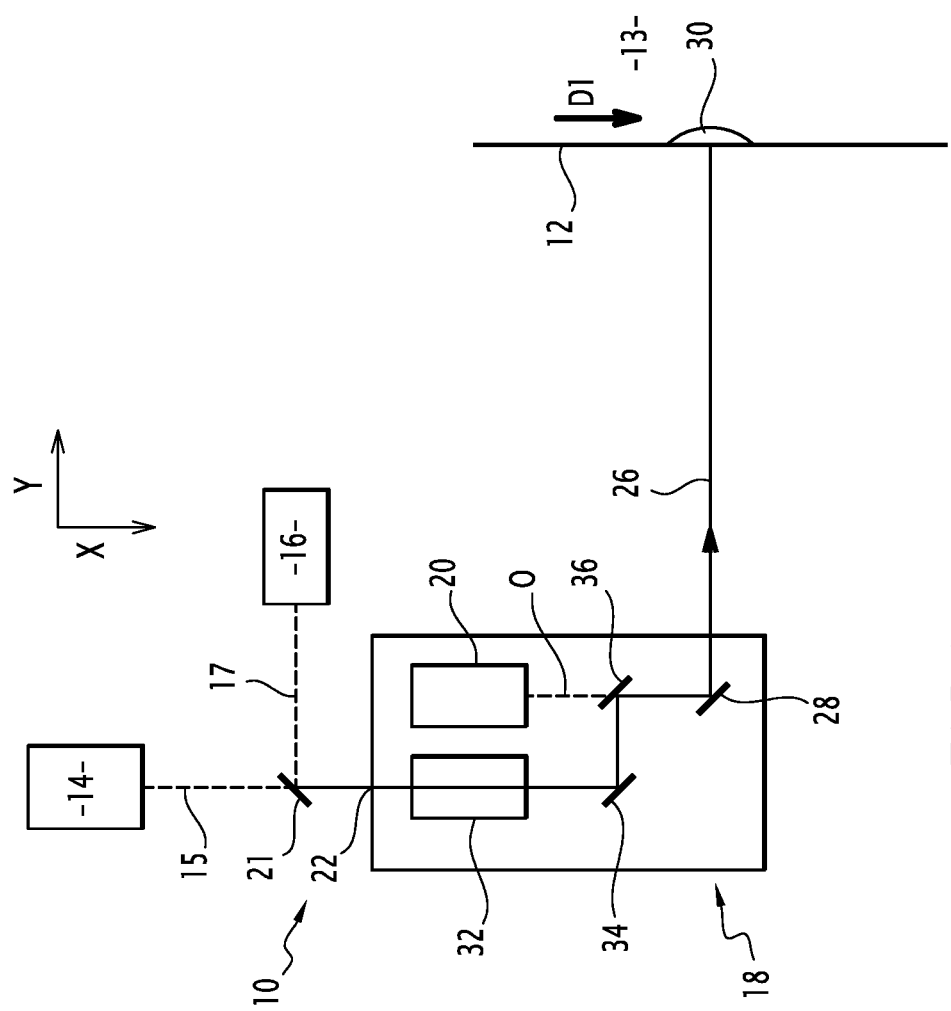

_US 10,746,679 B2_

METHOD FOR INSPECTING A METAL SURFACE AND ASSOCIATED DEVICE

The present invention relates to a method for inspecting a metal surface of a part.

BACKGROUND

Document FR 3,020,678 describes a photothermal inspection method for a part.

According to this method, the surface is scanned by two similar scanning devices each comprising a heat contribution element. To that end, each device comprises a laser source provided to emit a laser beam and a goniometer suitable for reflecting the laser beam toward the surface.

This makes it possible to perform a nondestructive inspection of a metal surface of a part.

Typically, this method implements laser beams having a wavelength substantially equal to 1064 nm, which is commonly used for applications requiring high heating powers.

SUMMARY OF THE INVENTION

However, such a laser beam has risks for any handling operator. More particularly, the laser beam may irreversibly damage the eyes of a handling operator who is not suitably equipped. Thus, wearing protective equipment is strictly required for any handling operator, and protective equipment is generally set up for the duration of the inspection.

This makes the inspection method complex to carry out, and may slow its implementation, in particular on an operating site, therefore a regular inspection of the parts in question.

One aim of the present disclosure is therefore to propose a device for inspecting a metal surface of a part that is easier to carry out.

To that end, an inspection method of the aforementioned type is provided, comprising the following steps:
  procuring a first laser source arranged to generate a first laser beam having a first wavelength comprised between 1000 nm and 1100 nm and a power greater than 1 W;
  procuring a second laser source arranged to generate a second laser beam having a second wavelength comprised between 1500 nm and 1800 nm and a power greater than 1 W;
  procuring an optic comprising an entrance for a laser beam, and a device arranged to project the laser beam on the metal surface and to scan the metal surface with the laser beam;
  activating one of the first and second laser sources and transmitting the first or second laser beam to the entrance of the optic;
  scanning the metal surface with the first or second laser beam projected by the optic;
  acquiring at least one image of the infrared radiation emitted by the metal surface.

The presence of two laser sources makes it possible to choose that which is most suitable for the desired use. The wavelengths between 1500 nm and 1800 nm do not penetrate the eye, which therefore makes it possible to simplify the protective elements placed during the inspection method.

An inspection method according to the present disclosure may comprise one or more of the following features, considered alone or according to all technically possible combinations:

during scanning, the metal surface is heated by the laser beam projected by the optic;

the optic comprises optical elements, the optical elements having the same absorption and transmission properties at the first wavelength and the second wavelength;

the method comprises a step for treating an optical surface of at least one of the optical elements, such that said optical element has the same absorption and transmission properties at the first wavelength and the second wavelength;

the method is provided for the inspection of new parts on a manufacturing site, the first laser source being activated and the first laser beam being transmitted to the entrance of the optic;

the method is provided for the inspection of parts already in use, the second laser source being activated and the second laser beam being transmitted to the entrance of the optic; and/or the image of the infrared radiation is acquired by a same sensor for the first laser source and the second laser source.

A device for inspecting a metal surface of a part is also provided, the device comprising:
  a first laser source arranged to generate a first laser beam having a first wavelength comprised between 1000 and 1100 nm and a power greater than 1 W;
  a second laser source arranged to generate a second laser beam having a second wavelength comprised between 1500 and 1800 nm and a power greater than 1 W;
  an optic comprising an entrance for a laser beam and a device arranged to project the laser beam on the metal surface and to scan the metal surface with the laser beam;
  a sensor capable of acquiring at least one image of the infrared radiation emitted by the metal surface,
  one or the other of the first and second laser beams being capable of being transmitted to the entrance of the optic.

An inspection device according to the present disclosure may comprise one or more of the following features, considered alone or according to all technically possible combinations:

the optic comprises optical elements, the optical elements having the same absorption and transmission properties at the first wavelength and the second wavelength; and/or at least one of the optical elements has a treated optical surface, such that said optical element has the same absorption and transmission properties at the first wavelength and the second wavelength.

BRIEF SUMMARY OF THE DRAWINGS

The invention will be better understood using the following description, provided solely as an example and done in reference to the appended figures, in which:

FIG. 1 is a schematic illustration of an inspection device according to one embodiment of the invention, and FIG. 2 is a schematic illustration of an inspection method according to one embodiment of the invention.

DETAILED DESCRIPTION

The described method is an examining method of the active photothermal type. The method is said to be active because the part to be characterized undergoes heating. The method is said to be photothermal because it is based on the acquisition of infrared images of the heated part.

This method is particularly suitable for detecting blocking or non-blocking defects in industrial components. It is particularly suitable for metal parts, in particular metal components of nuclear power plants.

The inspection method is intended to perform the mechanized, automated or robotic inspection of such parts, during manufacturing or maintenance.

FIG. 1 shows an inspection device 10 according to one embodiment of the invention.

The device 10 is provided to inspect a metal surface 12 of a part 13.

The device 10 comprises a first laser source 14, a second laser source 16, an optic 18 and a sensor 20.

The first laser source 14 is arranged to generate a first laser beam 15 having a first wavelength between 1000 and 1100 nm, more particularly equal to 1064 nm, and a power greater than 1 W.

Advantageously, the first laser source 14 is able to check and modify the power of the first laser beam in a given interval.

The first laser source 14 has an activated state, in which the source generates the first laser beam, and an off state, in which the source does not generate a laser beam.

The first laser beam 15 is for example oriented along a longitudinal direction X.

The second laser source 16 is arranged to generate a second laser beam 17 having a second wavelength between 1500 and 1800 nm and a power sufficient to create a temperature difference if at least one defect is present. The power is generally greater than 1 W, and more particularly greater than 10 W.

The second laser beam has a particular geometry. It is for example divergent.

Advantageously, the second laser source 16 is able to check and modify the power of the second laser beam in a given interval.

The second laser source 16 has an activated state, in which the source generates the second laser beam, and an off state, in which the source does not generate a laser beam.

The second laser beam 17 is for example oriented along a longitudinal direction Y, perpendicular to the longitudinal direction X.

The first laser beam 15 and the second laser beam 17 are oriented such that, if they were turned on at the same time, they would cross at a point of intersection.

At the point of intersection, an optical element 21 is provided to direct, at least partially, the first laser beam 15 and the second laser beam 17 toward the optic.

The optical element 21 is for example a semi-reflective mirror.

The first laser beam 15 at least partially traverses the semi-reflective mirror without being deviated, the optic 18 being substantially aligned with the first laser source 14 along the longitudinal direction X.

The second laser beam 17 is at least partially reflected by the semi-reflective mirror along an angle substantially equal to 45°.

After the point of intersection, the optical paths of the first laser beam 15 and the second laser beam 17 are combined, here substantially along the longitudinal direction X.

The optic 18 comprises an entrance 22 for a laser beam 26 and a device 24 arranged to project the laser beam 26 on the metal surface 12 and to scan the metal surface 12 with the laser beam 26.

One or the other of the first and second laser beams 15, 17 are capable of being transmitted to the entrance 22 of the optic 18, in particular owing to the optic 21 at the point of intersection.

The optic 18 comprises optical elements.

The optic 18 comprises a scanning device 28 of the laser beam comprising at least one of the optical elements, for example, a mirror or a goniometer whereof the orientation relative to the surface 12 is variable. Thus, the scanning device 28 is able to scan the laser beam 26 over the metal surface.

The laser beam transmitted to the entrance 22 of the optic 18 has an optical journey in the optic 18 delimited by the optical elements.

The optical elements have the same absorption and transmission properties at the first wavelength and the second wavelength.

At least one of the optical elements has a treated optical surface, such that said optical element has the same absorption and transmission properties at the first wavelength and the second wavelength.

The treatment of said optical surface for example consists of depositing a layer or a substrate made from borosilicate or borosilicate crown glass, for example marketed under the name N-BK7 or BK7 (registered trademarks). Alternatively or additionally, at least one of the optical elements by nature has the same absorption and transmission properties at the first wavelength and the second wavelength.

Thus, the first laser beam and the second laser beam have a similar optical journey in the optic 18.

One example optical elements is shown in FIG. 1, as well as the associated optical journey.

The optic 18 for example comprises, in the order of the optical journey of a laser beam, the following optical elements:
an optic for generating a laser beam 32,
a reflective mirror 34,
a dichroic filter 36, and
the scanning device 28, here a goniometer.

The optic for generating a laser sheet 32 in particular serves to generate a laser beam having a geometry in line form along a section plane perpendicular to the beam from a laser beam having a geometry in tip form along a section plane perpendicular to the beam. The beam then forms a sheet in three dimensions.

The optic for generating a laser sheet for example comprises a cylindrical lens.

The mirror 34 reflects the beam.

The dichroic filter 36 reflects any beam having a wavelength between 1000 nm and 1100 nm or 1500 nm and 1800 nm.

The dichroic filter further transmits the wavelengths in a given spectrum, for example corresponding to the operating spectrum of the sensor 20.

The mirror 34 and the dichroic filter 36 form an angle substantially equal to 45° with the optical path of the laser beam. Thus, the mirror 34 and the dichroic filter 36 reflect the laser beam along a right angle.

The scanning device 28 forms an angle between 45° minus a scanning angle and 45° plus the scanning angle. The total opening of the scanning device is between −45° and +45°.

Other embodiments in terms of the nature and arrangement of the optical elements are possible.

The laser beam 26 is oriented by the scanning device 28 toward the surface 12 and creates a heat contribution 30 on the surface 12.

The sensor 20 is capable of acquiring at least one image of the infrared radiation emitted by the metal surface 12.

The sensor 20 detects the wavelengths for the operating spectrum between 2000 nm and 0.1 mm, more particularly between 3 μm and 5 μm or between 8 μm and 12 μm.

The sensor 20 is for example a digital infrared camera having an optical axis O.

Part of the infrared radiation emitted by the metal surface 12 is transmitted to the optic at the output, reflected by the scanning device 28 and transmitted by the dichroic filter 36. The sensor 20 is for example placed such that said part of the radiation is captured by the sensor 20 after the transmission by the dichroic filter. Its optical axis O forms a 45° angle with the dichroic filter.

The laser beam 26 at the outlet of the optic 18 is collimated with the optical axis O of the sensor 20, i.e., the laser beam 26 is parallel to the optical axis O.

The dichroic filter in particular makes it possible to protect the sensor from a laser return. Indeed, the laser beam may be partially reflected or generate a secondary beam interacting with the surface and form a return. If this return reaches the sensor, it may damage it. The dichroic filter does not transmit the first and second wavelengths, and thus prevents a potential laser beam return from reaching the sensor 20.

The sensor 20 is able to acquire a plurality of images at a plurality of moments.

In one embodiment, the sensor 20 is provided to acquire images, each of the entire surface 12 to be inspected.

Alternatively, the sensor 20 is able to acquire an image of a zone of the surface, the sensor 20 being provided to scan the zone over the entire surface to be inspected. The zone comprises or is near the heat contribution on the surface 12 by the laser beam 26.

A method for inspecting the metal surface of a part will now be described in reference to FIG. 2.

The method is for example implemented by the inspection device previously described.

The method comprises the following steps:
procuring a first laser source 100;
procuring a second laser source 102;
procuring an optic 104;
activating one of the first and second laser sources and transmitting the first or second laser beam to the entrance of the optic 106;
scanning 108 the metal surface with the first or second laser beam projected by the optic;
acquiring 110 at least one image of the infrared radiation emitted by the metal surface.

The optic, the first laser source and the second laser source are similar to what was previously described.

Furthermore, the method optionally comprises a step for treating an optical surface of at least one of the optical elements of the optic, such that said optical element has the same absorption and transmission properties at the first wavelength and the second wavelength.

Only one laser source between the first laser source and the second source is activated, so as to transmit a single laser beam, from among the first laser beam and the second laser beam, as previously described, to the entrance 22 of the optic 18.

The transmitted laser beam 26 thus has, as entrance 22, either a wavelength between 1000 nm and 1100 nm and a power greater than 1 W, or a wavelength between 1500 nm and 1800 nm and a power greater than 1 W, advantageously greater than 10 W.

The beam transmitted to the entrance 22 of the optic 18 is particularly suitable for carrying out the method.

In one embodiment, the method is provided for the inspection of new parts on a manufacturing site. In this case, the first laser source is activated and the first laser beam is transmitted to the entrance of the optic.

The first laser beam has a first wavelength between 1,000 nm and 1,100 nm and a power greater than 1 W.

Alternatively, the method is provided for the inspection of parts already in use. Then, the second laser source is activated and the second laser beam is transmitted to the entrance of the optic.

The part is for example a Pelton wheel or a turbine disk.

The second laser beam has a wavelength between 1,500 nm and 1,800 nm and a power greater than 1 W, preferably greater than 10 W.

The method does not require as substantial an inspection device when a laser beam has a wavelength between 1000 nm and 1100 nm. Thus, the implementation of the inspection on an operating site is made easier.

The laser beam 26 is projected and scanned by the optic 18 on the surface 12.

The scanning is for example done along a plurality of lines substantially parallel to a first direction D1.

During the scanning, the laser beam 26 projected by the optic 18 generates a heat contribution 30 on the surface 12.

The heat contribution 30 has any type of shape.

The heat contribution is for example an elongated segment along directions perpendicular to the first direction D1, the elongated segment being generated owing to the optic generating the laser sheet 32. The segment has a length between 10 mm and 30 mm and a thickness between 1 mm and 3 mm on the surface 12.

Alternatively, the heat contribution 30 is a point moving at a high speed perpendicular to the first direction D1 so as to form a segment. This is for example done using the laser beam scanned on the one hand at a first speed along a direction perpendicular to the first direction D1 and on the other hand at a second speed along the first direction D1 in the context of the scanning 108, the optic 18 then not having a laser sheet 32 generating optic. The first speed is much faster than the second speed.

The heat contribution 30 can also take the form of a circle, ellipse, rectangle or any other appropriate shape.

The scanning 108 is done with an overlap of the heat contribution, such that each point of the surface, during the method, experiences a heat contribution due to the transmitted laser beam 26.

At least one image of the infrared radiation emitted by the surface 12 is acquired by the sensor 20.

The image of the infrared radiation is acquired by the same sensor 20 as the transmitted laser beam, i.e., the first laser beam or the second laser beam.

In one embodiment, the sensor 20 acquires an image of all of the infrared radiation emitted by the surface 12 upon each acquisition. A plurality of images of the infrared radiation of the surface 12 is acquired during the scanning 108.

Alternatively, the sensor 20 acquires an image of the infrared radiation emitted by a zone of the surface upon each acquisition. The zone is scanned with overlap on the entire surface to be inspected, simultaneously with the transmitted laser beam 26. The scanning of the zone is for example done along a plurality of lines substantially parallel to the first direction D1.

The zone comprises or is near the heat contribution on the surface 12 by the laser beam 26. The sensor 20 acquires a plurality of images of the infrared radiation during its scanning and the scanning 108 of the metal surface by the laser beam.

Then, the acquired images are processed so as to detect any defects in the part. Methods making it possible to process the images thus acquired are known from the state of the art, for example from document FR 3,020,678.

The presence of two laser sources having different characteristics makes it possible to choose the most appropriate laser beam for the provided use. On an operating site, for example, it may be complicated to establish all of the security measures typically implemented for a laser having a wavelength between 1000 nm and 1100 nm without excessively hindering operations. Thus, the use of a laser beam having a wavelength between 1500 nm and 1800 nm is more appropriate, such a laser beam limiting the risks and therefore the necessary equipment. The power greater than 1 W, preferably greater than 10 W, further makes it possible to penetrate the surface 12.

What is claimed is:

1. A method for inspecting a metal surface of a part, the method comprising the following steps:
   procuring a first laser source arranged to generate a first laser beam having a first wavelength comprised between 1000 nm and 1100 nm and a power greater than 1 W;
   procuring a second laser source arranged to generate a second laser beam having a second wavelength comprised between 1500 nm and 1800 nm and a power greater than 1 W;
   procuring an optic comprising an entrance for a laser beam, and a device arranged to project the laser beam on the metal surface and to scan the metal surface with the laser beam;
   activating one of the first and second laser sources and transmitting the first or second laser beam to the entrance of the optic;
   scanning the metal surface with the first or second laser beam projected by the optic; and
   acquiring at least one image of an infrared radiation emitted by the metal surface.

2. The inspection method according to claim 1, wherein, during the scanning, the metal surface is heated by the first or second laser beam projected by the optic.

3. The inspection method according to claim 1, wherein the optic comprises optical elements, the optical elements having a same absorption and transmission properties at the first wavelength and the second wavelength.

4. The inspection method according to claim 3, further comprising treating an optical surface of at least one of the optical elements, such that the optical element has the same absorption and transmission properties at the first wavelength and the second wavelength.

5. The inspection method according to claim 1, wherein the method is for inspecting of new parts on a manufacturing site, the first laser source being activated and the first laser beam being transmitted to the entrance of the optic.

6. The inspection method according to claim 1, wherein the method is for inspecting of parts already in use, the second laser source being activated and the second laser beam being transmitted to the entrance of the optic.

7. The inspection method according to claim 1, wherein the image of the infrared radiation is acquired by a same sensor for the first laser source and the second laser source.

8. A device for inspecting a metal surface of a part, the device comprising:
   a first laser source arranged to generate a first laser beam having a first wavelength comprised between 1000 and 1100 nm and a power greater than 1 W;
   a second laser source arranged to generate a second laser beam having a second wavelength comprised between 1500 and 1800 nm and a power greater than 1 W;
   an optic comprising an entrance for a laser beam and a device arranged to project the laser beam on the metal surface and to scan the metal surface with the laser beam; and
   a sensor capable of acquiring at least one image of the infrared radiation emitted by the metal surface,
   the first and second laser beams being configured, either one or the other, for transmission to the entrance of the optic.

9. The inspection device according to claim 8, wherein the optic comprises optical elements, the optical elements having a same absorption and transmission properties at the first wavelength and the second wavelength.

10. The inspection device according to claim 9, wherein at least one of the optical elements has a treated optical surface, such that the optical element has the same absorption and transmission properties at the first wavelength and the second wavelength.

* * * * *